United States Patent
Oda

(10) Patent No.: US 10,171,163 B2
(45) Date of Patent: Jan. 1, 2019

(54) SIGNAL QUALITY MEASUREMENT DEVICE AND SIGNAL QUALITY MEASUREMENT METHOD

(71) Applicant: FUJITSU LIMITED, Kawasaki-shi, Kanagawa (JP)

(72) Inventor: Shoichiro Oda, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/919,801

(22) Filed: Mar. 13, 2018

(65) Prior Publication Data

US 2018/0287698 A1 Oct. 4, 2018

(30) Foreign Application Priority Data

Mar. 29, 2017 (JP) .................... 2017-064823

(51) Int. Cl.
| | | |
|---|---|---|
| *H04B 10/07* | (2013.01) | |
| *H04B 10/079* | (2013.01) | |
| *H04B 10/61* | (2013.01) | |
| *H04J 14/02* | (2006.01) | |

(52) U.S. Cl.
CPC ....... *H04B 10/07953* (2013.01); *H04B 10/61* (2013.01); *H04J 14/0212* (2013.01); *H04J 14/0221* (2013.01)

(58) Field of Classification Search
CPC ............... H04B 10/07953; H04B 10/61; H04J 14/0212; H04J 14/0221
USPC .......................................................... 398/26
See application file for complete search history.

(56) References Cited

U.S. PATENT DOCUMENTS

| | | | |
|---|---|---|---|
| 6,151,158 A * | 11/2000 | Takeda | H01S 3/10023 359/337.12 |
| 6,433,864 B1 | 8/2002 | Chung et al. | |
| 2009/0214201 A1 | 8/2009 | Oda et al. | |
| 2009/0232500 A1* | 9/2009 | Villarruel | H04B 10/2575 398/65 |
| 2011/0026923 A1* | 2/2011 | Kim | H01S 5/50 398/79 |
| 2011/0280581 A1* | 11/2011 | Chann | G02B 6/2931 398/98 |

(Continued)

FOREIGN PATENT DOCUMENTS

| | | |
|---|---|---|
| JP | 2009-141553 | 6/2009 |
| JP | 2009-198364 | 9/2009 |
| JP | 2016-143975 | 8/2016 |

*Primary Examiner* — Don N Vo
(74) *Attorney, Agent, or Firm* — Staas & Halsey LLP

(57) ABSTRACT

A signal quality measurement device includes: a setting processing unit that sets respective passbands of WSSs; and a calculating unit that calculates quality of an optical signal by acquiring a first power of an optical component in a first wavelength band, and a second power of an optical component in a second wavelength band adjacent to the first wavelength band. When the setting processing unit sets each of the passbands of the WWSs, the calculating unit detects a combined power of various ASEs of the optical amplifiers from the second power, and detects the power of the optical signal from the first power and the second power. When the setting processing unit sets the passband of one of the WSSs, the calculating unit detects, from the second power, the ASE of an optical amplifier existing between one of the wavelength selective switches and the receiver.

12 Claims, 9 Drawing Sheets

(56) References Cited

U.S. PATENT DOCUMENTS

2012/0219285 A1\* 8/2012 Dahan ............. H04B 10/07953
398/26
2016/0226580 A1 8/2016 Oda et al.

\* cited by examiner

SIGNAL QUALITY MEASUREMENT DEVICE AND SIGNAL QUALITY MEASUREMENT METHOD

CROSS-REFERENCE TO RELATED APPLICATION

This application is based upon and claims the benefit of priority of the prior Japanese Patent Application No. 2017-064823 filed on Mar. 29, 2017, the entire contents of which are incorporated herein by reference.

FIELD

A certain aspect of the embodiments described herein relates to a signal quality measurement device and a signal quality measurement method.

BACKGROUND

An optical signal-to-noise ratio (OSNR) is known as an indicator of the quality of an optical signal, for example. Japanese Laid-open Patent Publication No. 2009-198364 and U.S. Pat. No. 6,433,864 disclose techniques related to OSNR measurement, for example.

SUMMARY

A network is designed in accordance with various kinds of parameters, such as the bit rate and the modulation method for optical signals, and the performance of optical fibers. However, these parameters are not actual measured values, but are values determined in advance. Therefore, the accuracy of the design is low, and a transmission distance might become shorter than an expected value. To count this, the quality, such as the OSNRs, of optical signals are preferably measured in advance, and are used in designing a network.

According to the technique disclosed in Japanese Laid-Open Patent Publication No. 2009-198364, for example, it is possible to measure the OSNR of an optical signal transmitted from a transmitter to a receiver, but it is not possible to measure the OSNR of an optical signal in a transmission path. Therefore, it is difficult to effectively increase the accuracy in designing a network. Meanwhile, according to the technique disclosed in U.S. Pat. No. 6,433,864, it is possible to measure the OSNR of an optical signal at different sites in a transmission path, by installing monitoring devices at these sites. As the monitoring devices are used, there might be an increase in the cost.

According to an aspect of the embodiments, there is provided a signal quality measurement device that measures quality of an optical signal that is transmitted from a transmitter, passes through wavelength selective switches and optical amplifiers, and is received by a receiver, the signal quality measurement device including: a setting processing unit that sets respective passbands of the wavelength selective switches; and a calculating unit that calculates the quality of the optical signal by acquiring a first power of an optical component in a first wavelength band including a center wavelength of the optical signal received by the receiver, and a second power of an optical component in a second wavelength band adjacent to the first wavelength band, wherein the calculating unit detects a combined power of various amplified spontaneous emissions of the optical amplifiers from the second power, and detects a power of the optical signal from the first power and the second power, when the setting processing unit sets each of the passbands of the wavelength selective switches as a wavelength band including the first wavelength band and the second wavelength band, detects, from the second power, the amplified spontaneous emission of at least one optical amplifier existing between one of the wavelength selective switches and the receiver among the optical amplifiers, when the setting processing unit sets the passband of one of the wavelength selective switches as the first wavelength band, and calculates the quality of the optical signal from each of the detected powers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
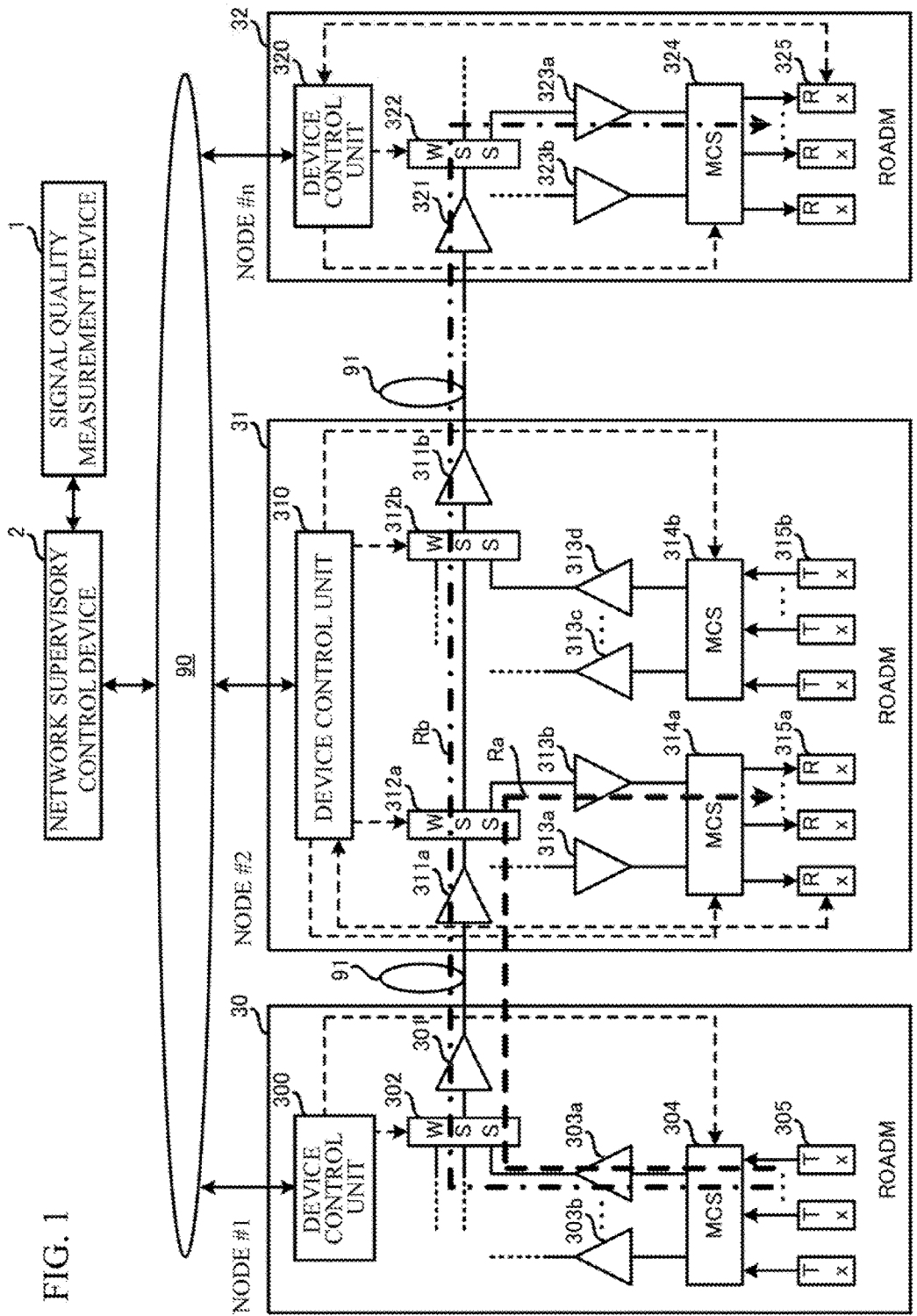
FIG. 1 is a configuration diagram showing an example network system.

FIG. 1 is a configuration diagram showing an example network system. The network system includes a signal quality measurement device 1, a network supervisory control device 2, and reconfigurable optical add/drop multiplexers (ROADMs) 30 through 32.

The ROADMs 30 through 32 are an example of a transmission device, and transmit optical signals having different center wavelengths after performing wavelength multiplexing on the optical signals. The ROADMs 30 through 32 have an "add" function to multiplex optical signals transmitted from transmitters 305 and 315*b* into a multiple-wavelength optical signal, and a "drop" function to divide a multiple-wavelength optical signal into optical signals to be received by receivers 315*a* and 325.

For Example, the ROADM 30 is provided in a node #1, the ROADM 31 is provided in a node #2, and the ROADM 32 is provided in a node #n (n being an integer of 3 or greater). It should be noted that the ROADM(s) in the node(s) existing between the node #2 and the node #n is (are) not shown in the drawing.

The ROADMs 30 through 32 each communicate with the network supervisory control device 2 via a control network 90 formed with a local area network (LAN), for example. The network supervisory control device 2 is formed with a server, for example, and supervises and controls each of the ROADMs 30 through 32.

The signal quality measurement device 1 is formed with a server, for example, and measures the qualities of optical signals transmitted from the ROADMs 30 through 32. In a quality measurement process, the signal quality measurement device 1 communicates with the ROADMs 30 through 32 via the control network 90. In this example, OSNRs are described as the qualities of optical signals, but the qualities of optical signals are not necessarily OSNRs.

The ROADMs 30 through 32 are connected in series to one another by a transmission path 91 formed with optical fibers. However, the ROADMs 30 through 32 are not necessarily connected in series, but may be connected to one another to form a mesh or ring network. The configurations of the ROADMs 30 through 32 are described below.

The ROADM 30 includes a device control unit 300, a wavelength selective switch (WSS) 302, optical amplifiers 301, 303a, and 303b, a multicast switch (MCS) 304, and transmitters (Tx) 305. It should be noted that only the components related to the add function for multiple-wavelength optical signals toward the adjacent node #2 are shown as the components of the ROADM 30 in the drawing, and the other components of the ROADM 30 are not shown.

The device control unit 300 is formed with a central processing unit (CPU) circuit, for example, and controls transmission processes to be performed by the ROADM 30. The transmitters 305 are formed with laser diodes and optical modulators, for example, and transmit optical signals of predetermined wavelengths by a digital coherent optical transmission method, for example. The transmitters 305 transmit optical signals of different wavelengths. The respective optical signals are input to the MCS 304.

The MCS 304 is an example of an optical switch, and is formed with a planar lightwave circuit, for example. The MCS 304 outputs the respective optical signals from output ports suitable for the settings provided from the device control unit 300. Each of the output ports is connected to the optical amplifiers 303a and 303b.

The optical amplifiers 303a and 303b are formed with erbium-doped fiber amplifiers (EDFAs), for example, and amplify the optical signals. At this stage, an amplified spontaneous emission (ASE) as a noise component is superimposed on the optical signals by the EDFAs. The optical signals amplified by the optical amplifier 303a are input to the WSS 302. The optical signals amplified by the optical amplifier 303b are input to the WSS (not shown) in the other path.

The WSS 302 functions as an optical filter, and has passbands for the respective channels corresponding to the center wavelengths of the optical signals. The passbands of the WSS 302 are set for the respective channels by the device control unit 300. The WSS 302 performs wavelength multiplexing on the optical signals input from the optical amplifier 303a and the optical signals (or the multiple-wavelength optical signals) input from the other path, and outputs the resultant signal to the optical amplifier 301. That is, the WSS 302 performs wavelength multiplexing on optical signals selected from the respective optical signals input from input ports, and outputs the resultant signal.

The optical amplifier 301 is formed with an erbium-doped fiber amplifier (EDFA), for example, and amplifies the optical signal. At this stage, an amplified spontaneous emission (ASE) as a noise component is superimposed on the optical signal by the EDFA. The optical signal amplified by the optical amplifier 301 is input to the ROADM 31 of the node #2 via the transmission path 91.

The ROADM 31 includes a device control unit 310, wavelength selective switches (WSSs) 312a and 312b, optical amplifiers 311a, 311b, and 313a through 313d, multicast switches (MCSs) 314a and 314b, receivers (Rx) 315a, and transmitters (Tx) 315b. It should be noted that only the components related to the drop function for multiple-wavelength optical signals from the adjacent node #1 and the components related to the add function for multiple-wavelength optical signals toward the adjacent node #3 are shown as the components of the ROADM 31 in the drawing, and the other components of the ROADM 31 are not shown.

The device control unit 310 is formed with a CPU circuit, for example, and controls transmission processes to be performed by the ROADM 31. The multiple-wavelength optical signal from the ROADM 30 of the adjacent node #1 is input to the optical amplifier 311a.

The optical amplifier 311a is formed with an erbium-doped fiber amplifier (EDFA), for example, and amplifies the multiple-wavelength optical signal. At this stage, an amplified spontaneous emission (ASE) as a noise component is superimposed on the multiple-wavelength optical signal by the EDFA. The optical signal amplified by the optical amplifier 311a is input to the WSS 312a.

The WSS 312a functions as an optical filter, and has passbands for the respective channels corresponding to the center wavelengths of optical signals. The passbands of the WSS 312a are set for the respective channels by the device control unit 310. From among the optical signals wavelength-multiplexed into the multiple-wavelength optical signal input from the optical amplifier 311a, the WSS 312a selects the optical signals of the channels corresponding to the settings provided from the device control unit 310 and outputs the optical signals to the optical amplifier 313b, while outputting the other optical signals (or a multiple-wavelength optical signal) to the other WSS 312b.

That is, the WSS 312a separates the selected optical signals from the optical signals contained in the multiple-wavelength optical signal input from respective input ports, and outputs the separated optical signals from respective output ports. Meanwhile, the optical signals separated by the WSS (not shown) in the other path are input to the optical amplifiers 313a.

The optical amplifiers 313a and 313b are formed with erbium-doped fiber amplifiers (EDFAs), for example, and amplify the optical signals. At this stage, an amplified spontaneous emission (ASE) as a noise component is superimposed on the optical signals by the EDFAs. The optical signals amplified by the optical amplifiers 313a and 313b are input to the MCS 314a.

The MCS 314a is an example of an optical switch, and is formed with a planar lightwave circuit, for example. The MCS 314a outputs the respective optical signals from output ports suitable for the settings provided from the device control unit 310. The respective output ports are connected to the receivers 315a.

The receivers 315a are formed with photodiodes, for example, and receive the optical signals. The receivers 315a measure the powers of the optical signals and the power of the ASE, and notify the device control unit 310 of the measured values. The device control unit 310 transmits the measured values to the signal quality measurement device 1 via the control network 90 and the network supervisory control device 2. The configuration of the receivers 315a will be described later in detail.

The transmitters 315b are formed with laser diodes and optical modulators, for example, and transmit the optical signals of predetermined wavelengths. The transmitters 315b transmit optical signals of different wavelengths. The respective optical signals are input to the MCS 314b.

The MCS 314b is an example of an optical switch, and is formed with a planar lightwave circuit, for example. The MCS 314b outputs the respective optical signals from output ports suitable for the settings provided from the device control unit 310. The respective output ports are connected to the optical amplifiers 313c and 313d.

The optical amplifiers 313c and 313d are formed with erbium-doped fiber amplifiers (EDFAs), for example, and amplify the optical signals. At this stage, an amplified spontaneous emission (ASE) as a noise component is superimposed on the optical signals by the EDFAs. The optical signals amplified by the optical amplifier 313d are input to the WSS 312b. The optical signals amplified by the optical amplifier 313c are input to the WSS (not shown) in the other path.

The WSS 312b functions as an optical filter, and has passbands for the respective channels corresponding to the center wavelengths of the optical signals. The passbands of the WSS 312b are set for the respective channels by the device control unit 310. The WSS 312b performs wavelength multiplexing on the optical signals input from the WSS 312a, the optical signals input from the optical amplifier 313d, and the optical signals (or the multiple-wavelength optical signals) input from the other path, and outputs the resultant signal to the optical amplifier 311b. That is, the WSS 312b performs wavelength multiplexing on optical signals selected from the respective optical signals input from input ports, and outputs the resultant signal.

The optical amplifier 311b is formed with an erbium-doped fiber amplifier (EDFA), for example, and amplifies the optical signal. At this stage, an amplified spontaneous emission (ASE) as a noise component is superimposed on the optical signal by the EDFA. The optical signal amplified by the optical amplifier 311b is input to the ROADM (not shown) of the node #3 via the transmission path 91.

In this manner, the multiple-wavelength optical signal is transmitted, and is input to the ROADM 32 of the node #n.

The ROADM 32 includes a device control unit 320, a wavelength selective switch (WSS) 322, optical amplifiers 321, 323a, and 323b, a multicast switch (MCS) 324, and receivers (Rx) 325. It should be noted that only the components related to the drop function for multiple-wavelength optical signals from the adjacent node #(n-1) are shown as the components of the ROADM 32 in the drawing, and the other components of the ROADM 32 are not shown.

The device control unit 320 is formed with a CPU circuit, for example, and controls transmission processes to be performed by the ROADM 32. A multiple-wavelength optical signal from the ROADM of the adjacent node #(n-1) is input to the optical amplifier 321.

The WSS 322 functions as an optical filter, and has passbands for the respective channels corresponding to the center wavelengths of optical signals. The passbands of the WSS 322 are set for the respective channels by the device control unit 320. From among the optical signals wavelength-multiplexed into the multiple-wavelength optical signal input from the optical amplifier 321, the WSS 322 selects the optical signals of the channels corresponding to the settings provided from the device control unit 320 and outputs the optical signals to the optical amplifier 323a, while outputting the other optical signals (or a multiple-wavelength optical signal) to the WSS (not shown) in the other path.

That is, the WSS 322 separates the selected optical signals from the optical signals contained in the multiple-wavelength optical signal input from respective input ports, and outputs the separated optical signals from respective output ports. Meanwhile, the optical signals separated by the WSS (not shown) in the other path are input to the optical amplifiers 323b.

The optical amplifiers 323a and 323b are formed with erbium-doped fiber amplifiers (EDFAs), for example, and amplify the optical signals. At this stage, an amplified spontaneous emission (ASE) as a noise component is superimposed on the optical signals by the EDFAs. The optical signals amplified by the optical amplifiers 323a and 323b are input to the MCS 324.

The MCS 324 is an example of an optical switch, and is formed with a planar lightwave circuit, for example. The MCS 324 outputs the respective optical signals from output ports suitable for the settings provided from the device control unit 320. The respective output ports are connected to the receivers 325.

The receivers 325 are formed with photodiodes, for example, and receive the optical signals. The receivers 325 measure the powers of the optical signals and the power of the ASE, and notify the device control unit 320 of the measured values. The device control unit 320 transmits the measured values to the signal quality measurement device 1 via the control network 90 and the network supervisory control device 2.

The signal quality measurement device 1 selects an optical signal being transmitted between particular nodes, and measures the quality thereof. In a case where an optical signal between the node #1 and node #2 is selected, for example, the signal quality measurement device 1 measures the OSNR of the optical signal being transmitted along a transmission path Ra indicated by a dotted line.

In this case, the signal quality measurement device 1 sets the passbands of the WSSs 302 and 312a in the transmission path Ra, and acquires powers of predetermined wavelengths in the corresponding optical channel measured by the receivers 315a, from the receivers 315a in the transmission path Ra. By setting the passbands of the WSSs 302 and 312a, the signal quality measurement device 1 detects, from the acquired powers, the power of the optical signal and the powers of the ASEs of the optical amplifiers 303a, 301, 311a, and 313b, and calculates the OSNR of the optical signal at more than one point in the transmission path Ra.

In a case where an optical signal between the node #1 and the node #n is selected, for example, the signal quality measurement device 1 measures the OSNR of the optical signal being transmitted along a transmission path Rb indicated by a dot-and-dash line. In this case, the signal quality measurement device 1 sets the passbands of the WSSs 302, 312a, 312b, 322, and the like in the transmission path Rb, and acquires powers of predetermined wavelengths measured by the receivers 325, from the receivers 325 in the transmission path Rb. By setting the passbands of the WSSs 302, 312a, 312b, 322, and the like, the signal quality measurement device 1 detects, from the acquired powers, the power of the optical signal, and the power of the ASEs of the optical amplifiers 303a, 301, 311a, 311b, 321, 323a, and the like, and then calculates the OSNR of the optical signal at more than one point in the transmission path Rb.

In the above manner, the signal quality measurement device 1 measures the OSNRs of optical signals that are transmitted from the transmitters 305 and are received by the receivers 315a and 325 after passing through the WSSs 302, 312a, 312b, and 322 and the optical amplifiers 303a, 301, 311a, 311b, 313b, 321, and 323a. Although an example of calculation of the OSNR of an optical signal in the transmission path Ra will be described below, the same calculation can be applied to an optical signal in the transmission path Rb.

Figure 2:
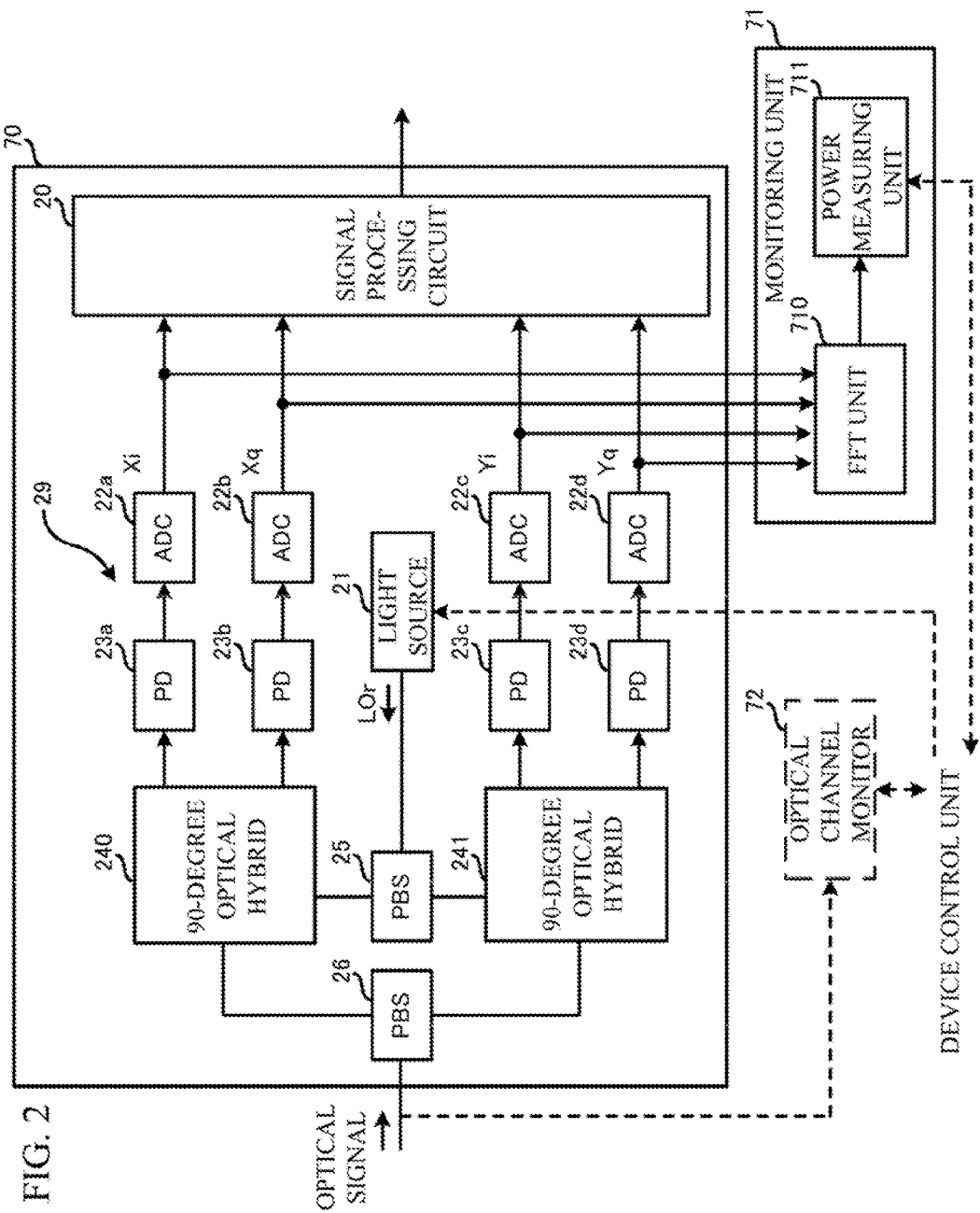
FIG. 2 is a configuration diagram showing an example receiver.

FIG. 2 is a configuration diagram showing an example of a receiver 315a or 325. The receiver 315a or 325 includes a receiving unit 70 that performs an optical signal reception process, and a monitoring unit 71 that analyzes the spectrum of a received optical signal and measures the power of a predetermined wavelength.

The receiving unit 70 includes a signal processing circuit 20, analog-to-digital converters (ADCs) 22a through 22d, and a coherent receiver 29. The coherent receiver 29 includes a light source 21, photodiodes (PDs) 23a through 23d, 90-degree optical hybrid circuits 240 and 241, and PBSs 25 and 26.

The PBS 26 divides an optical signal into an X-axis component and a Y-axis component, and outputs the X-axis component and the Y-axis component to the 90-degree optical hybrid circuits 240 and 241, respectively. The light source 21 inputs local oscillation light LOr to the PBS 25. The PBS 25 divides the local oscillation light LOr into an X-axis component and a Y-axis component, and outputs the X-axis component and the Y-axis component to the 90-degree optical hybrid circuits 240 and 241, respectively.

The 90-degree optical hybrid circuit 240 has a waveguide for causing the X-axis component of the optical signal and the X-axis component of the local oscillation light LOr to interfere with each other, and detects the X-axis component of the optical signal. As a result of the detection, the 90-degree optical hybrid circuit 240 outputs optical components corresponding to the amplitudes and the phases of the in-phase component and the quadrature-phase component to the PDs 23a and 23b, respectively.

The 90-degree optical hybrid circuit 241 has a waveguide for causing the Xaxis component of the optical signal and the axis component of the local oscillation light LOr to interfere with each other, and detects the Y-axis component of the optical signal. As a result of the detection, the 90-degree optical hybrid circuit 241 outputs optical components corresponding to the amplitudes and the phases of the in-phase component and the quadrature-phase component to the PDs 23c and 23d, respectively.

The PDs 23a through 23d convert the input optical components into electrical signals, and output the electrical signals to the ADCs 22a through 22d, respectively. The ADCs 22a through 22d convert the electrical signals input from the PDs 23a through 23d into digital signals Xi, Xq, Yi, and Yq, respectively. The digital signals Xi, Xq, Yi, and Yq are input to the signal processing circuit 20. The signal processing circuit 20 compensates for wavelength dispersion or a nonlinear optical effect caused in the optical signal of the transmission path 91, and demodulates and outputs the optical signal. The signal processing circuit 20 is formed with a digital signal processor (DSP), for example. However, the signal processing circuit 20 is not necessarily formed with a DSP, but may be formed with a field programmable gate array (FPGA), for example.

The digital signals Xi, Xq, Yi, and Yq output from the ADCs 22a through 22d to the signal processing circuit 20 are input to the monitoring unit 71. The monitoring unit 71 includes a fast Fourier transform (FFT) unit 710 and a power measuring unit 711. The FFT unit 710 and the power measuring unit 711 are formed with hardware such as DSPs or FPGAs. However, the FFT unit 710 and the power measuring unit 711 are not necessarily formed with hardware, but may be formed with software, for example.

The FFT unit 710 converts the digital signals Xi, Xq, Yi, and Yq from time domain signals to frequency domain signals, and outputs the converted signals to the power measuring unit 711. The power measuring unit 711 analyzes the spectrums of the digital signals Xi, Xq, Yi, and Yq converted into frequency domain signals, and measures the powers of predetermined wavelengths. More specifically, the power measuring unit 711 measures the respective powers of wavelengths $\lambda s$ and $\lambda a$ in the wavelength band assigned to the corresponding channel of the optical signal. The wavelengths $\lambda s$ and $\lambda a$ are set beforehand by the signal quality measurement device 1 via the device control units 310 and 320, for example. The power measuring unit 711 notifies the signal quality measurement device 1 of the measured power values via the device control units 310 and 320.

Instead of the monitoring unit 71, an optical channel monitor (OCM) 72 may be used as the power measuring means. The OCM 72 measures the respective powers of the wavelengths $\lambda s$ and $\lambda a$ in the wavelength band of the channel of the optical signal, and notifies the signal quality measurement device 1 of the measured powers.

The OCM 72 may be "MEMS Optical Channel Monitor", manufactured by DiCon Fiberoptics Inc., or "Flexgrid High Resolution Optical Channel Monitor", manufactured by Finisar Corporation, for example. The former has a frequency resolution of 50 (GHz), and accordingly, is used in cases where the bandwidth between the subject channel and an adjacent channel is great, for example. The latter has a frequency resolution of 6.25 (GHz), and accordingly, is used in cases where the bandwidth between the subject channel and an adjacent channel is small, for example.

Next, a process of measuring the OSNR of an optical signal in the transmission path Ra is described.

Figure 3:
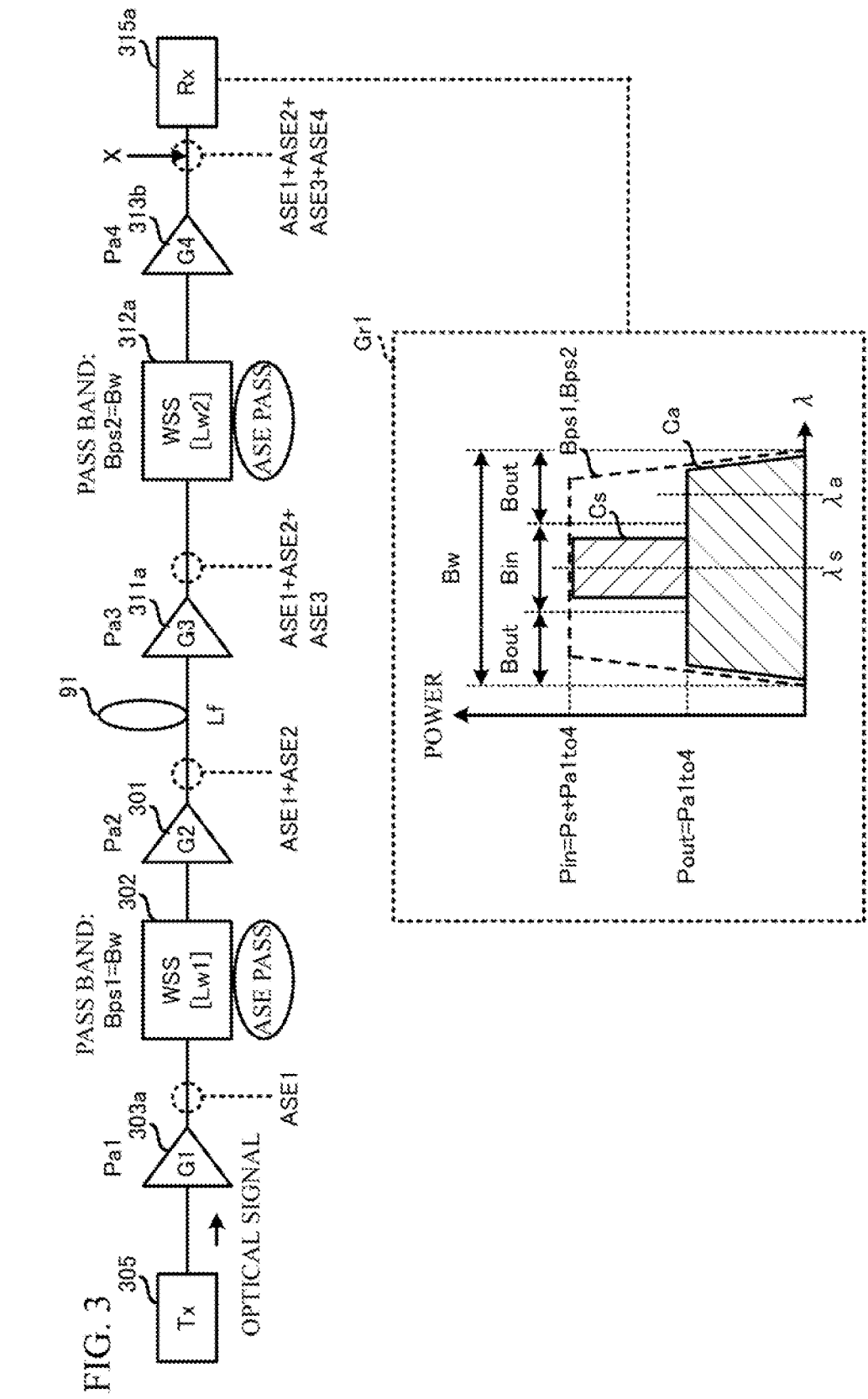
FIG. 3 is a diagram showing an example of a process of measuring the OSNR of an optical signal at the receiving end of a transmission path.

FIG. 3 is a diagram illustrating an example process of measuring the OSNR of an optical signal at the receiving end of the transmission path Ra. FIG. 3 shows a transmitter 305, the optical amplifiers 303a, 301, 311a, and 313b, the WSSs 302 and 312a, and the receiver 315a, which exist in the transmission path Ra. Since the MCSs 304 and 314a do not affect OSNRs, it is assumed that no power loss is caused by the MCSs 304 and 314a.

In this example, G1 represents the gain of the optical amplifier 303a, G2 represents the gain of the optical amplifier 301, G3 represents the gain of the optical amplifier 311a, and G4 represents the gain of the optical amplifier 313b. Further, Lw1 represents the loss of the WSS 302, Lw2 represents the loss of the WSS 312a, and Lf represents the loss of the transmission path 91.

An ASE1 of a power Pa1 is superimposed on the optical signal as the optical signal passes through the optical amplifier 303a, and an ASE2 of a power Pa2 is superimposed on the optical signal as the optical signal passes through the optical amplifier 301. Further, an ASE3 of a power Pa3 is superimposed on the optical signal as the optical signal passes through the optical amplifier 311a, and an ASE4 of a power Pa4 is superimposed on the optical signal as the optical signal passes through the optical amplifier 313b. Each potion indicated by a circle drawn by a dotted line indicates the ASE included in sidebands Bout in the spectrum waveform chart indicated by reference sign Gr1.

As indicated by reference sign X, the signal quality measurement device 1 measures the OSNR of the optical signal at the receiving end of the transmission path Ra, or the optical signal to be input to the receiver 315a. As to the corresponding channel of the optical signal, the signal quality measurement device 1 regards the passband Bps1 of the WSS 302 and the passband Bps2 of the WSS 312a as a wide band Bw in the spectrum waveform chart indicated by reference sign Gr1.

In the portion indicated by reference sign Gr1, the spectrum waveform to be analyzed by the monitoring unit 71 or the OCM 72 of the receiver 315a (the characteristics of the power with respect to the wavelength λ) is shown together with the passband Bps1 of the WSS 302 and the passband Bps2 of the WSS 312a. The wide band Bw is the band assigned to the corresponding channel of the optical signal by the network supervisory control device 2.

A narrow band Bin is an example of the first wavelength band, and is a predetermined wavelength band including the center wavelength λs of the optical signal. Meanwhile, the sidebands Bout are an example of the second wavelength band, and are predetermined wavelength bands adjacent to the long-wavelength side and the short-wavelength side of the narrow band Bin. The total bandwidth of the narrow band Bin and the sidebands Bout is equal to the bandwidth of the wide band Bw. That is, the wide band Bw is a wavelength band including the narrow band Bin and the sidebands Bout.

The narrow band Bin includes the signal component Cs of the optical signal and an optical component Ca of an ASE (this optical component will be hereinafter referred to as an "ASE component"). Each sideband Bout includes an ASE component Ca.

The monitoring unit 71 or the OCM 72 of the receiver 315a measures the power Pin at the center wavelength λs of the optical signal (this power will be hereinafter referred to as the "center power"), and measures the power Pout at the wavelength λa in a sideband Bout (this power will be hereinafter referred to as the "side power"). The center power Pin is an example of the first power of the optical component in the narrow band Bin including the center wavelength λs of the optical signal, and the side power Pout is an example of the second power of the optical component in a sideband Bout adjacent to the narrow band Bin. The wavelength λa is set in the sideband Bout on the long-wavelength side of the narrow band Bin, but may be set in the sideband Bout on the short-wavelength side of the narrow band Bin. The wavelength λa is set at the center of the sideband Bout, for example.

The signal quality measurement device 1 calculates the OSNR of the optical signal by acquiring the center power Pin and the side power Pout from the monitoring unit 71 or the OCM 72. As the signal quality measurement device 1 sets the passbands Bps1 and Bps2 of the respective WSSs 302 and 312a in the wide band Bw, the ASE1 of the sidebands Bout passes through the WSS 302, and the ASE1 through ASE4 of the sidebands Bout pass through the WSS 312a (see "ASE pass"). Thus, the side power Pout becomes equal to the combined power Pa1to4 of all the ASE1 through ASE4.

Meanwhile, the center power Pin becomes equal to the sum of the power Ps of the signal component of the optical signal in the receiver 315a and the combined power Pa1to4 of all the ASE1 through ASE4. Accordingly, the power Ps of the signal component of the optical signal has the value obtained by subtracting the side power Pout from the center power Pin.

$$OSNR = Ps/PA1to4 = Ps/Pout \quad (1)$$
$$= (Pin - Pout)/Pout$$

Thus, the signal quality measurement device 1 calculates the OSNR of the optical signal at the receiving end of the transmission path Ra according to the above equation (1).

By setting the respective passbands of the WSSs 302 and 312a in the wide band Bw including the narrow band Bin and the sidebands Bout as described above, the signal quality measurement device 1 detects the combined power Pa1to4 of the ASE1 through ASE4 from the side power Pout, and detects the power Ps of the optical signal from the center power Pin and the side power Pout. In this manner, the signal quality measurement device 1 measures the OSNR of the optical signal to be input to the receiver 315a (or the optical signal at the receiving end).

Figure 4:
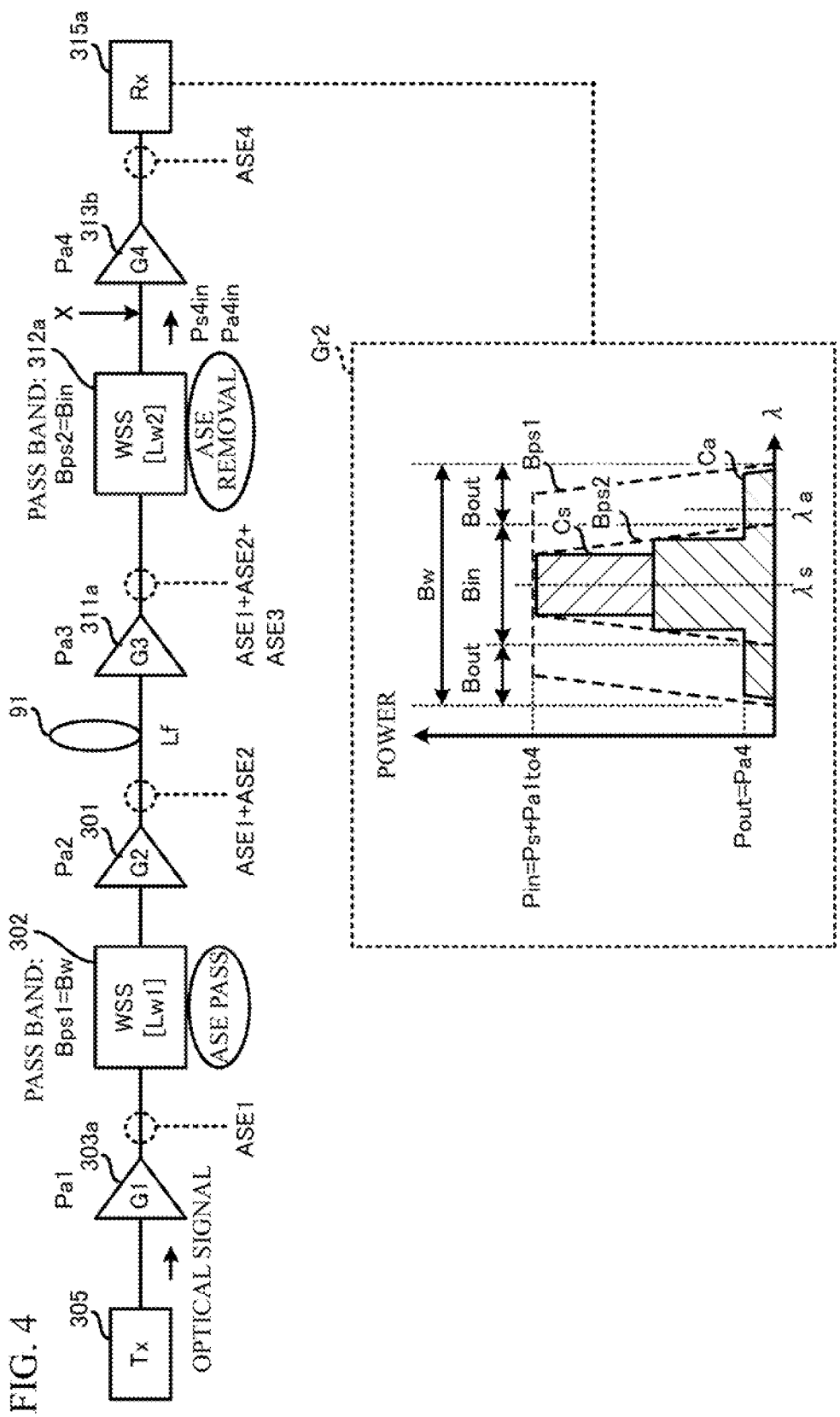
FIG. 4 is a diagram showing an example of a process of measuring the OSNR of an optical signal in the middle of a transmission path.

FIG. 4 is a diagram showing an example process of measuring the OSNR of an optical signal in the middle of the transmission path Ra. Regarding FIG. 4, the same reference signs as those used in FIG. 3 are not explained herein. In the portion indicated by reference sign Gr2, the spectrum waveform analyzed by the monitoring unit 71 or the OCM 72 of the receiver 315a is shown together with the passband Bps1 of the WSS 302 and the passband Bps2 of the WSS 312a. As indicated by reference sign X, the signal quality measurement device 1 measures the OSNR of the optical signal at the output end of the WSS 312a, or the input end of the optical amplifier 313b.

In this example, with respect to the corresponding channel of the optical signal, the signal quality measurement device 1 sets the passband Bps2 of the WSS 312a in the narrow band Bin, so that the ASE1 through ASE3 included in the sidebands Bout are removed at the WSS 312a (see "ASE removal"). Therefore, at the receiver 315a, only the ASE4 is included in the sidebands Bout. Accordingly, the side power Pout becomes equal to the power Pa4 of the ASE4.

$$OSNR = Ps/PA1to4 \quad (2)$$
$$= G4 \cdot Ps4in/(G4 \cdot Pa4in + Pa4)$$

The OSNR at the receiving end (see reference sign X in FIG. 3) is expressed by the above equation (2) using the power Ps4in of the optical signal and the power Pa4in of the ASE at the input end of the optical amplifier 313b. Here, the power Ps of the optical signal at the receiving end has the value obtained by multiplying the power Ps4in of the optical signal at the input end of the optical amplifier 313b by the gain G4 of the optical amplifier 313b. Meanwhile, the combined power Pa1to4 of the ASE1 through ASE4 has the value obtained by adding the power Pa4 of the ASE4 of the optical amplifier 313b to the value obtained by multiplying the power Pa4in of the ASE at the input end of the optical amplifier 313b by the gain G4 of the optical amplifier 313b.

$$OSNR\_4 = Ps4in/Pa4in \quad (3)$$
$$= (G4 \cdot Ps4in)/(G4 \cdot Pa4in)$$
$$= Ps/(Pa1to4 - Pa4)$$

Therefore, where OSNR_4 represents the OSNR of the optical signal at the input end of the optical amplifier 313b, OSNR4 is expressed by the above equation (3) based on the equation (2). In the equation (3), the power Ps of the optical signal at the receiving end and the combined power Pa1to4 of the ASE1 through ASE4 are obtained through the measurement process illustrated in FIG. 3.

$$OSNR\_4 = Ps/(Pa1to4 - Pout) \qquad (4)$$

Thus, the signal quality measurement device 1 can calculate OSNR_4 according to the above equation (4) using the side power Pout.

By setting the passband of the WSS 312a in the narrow band Bin as described above, the signal quality measurement device 1 detects, from the side power Pout, the power Pa4 of the ASE4 of the optical amplifier 313b between the WSS 312a and the receiver 315a. The signal quality measurement device 1 then calculates OSNR_4 from the detected powers Ps, Pa1to4, and Pa4.

Thus, the signal quality measurement device 1 can measure the OSNR (OSNR_4) of the optical signal at the input end of the optical amplifier 313b by acquiring the center power Pin and the side power Pout measured at the receiver 315a.

In this example, the signal quality measurement device 1 sets the passband Bps1 of the WSS 302 in the wide band Bw. However, the ASE1 through ASE3 of the sidebands Bout are removed at the WSS 312a in a later stage, and therefore, the signal quality measurement device 1 may set the passband Bps1 in the narrow band Bin.

Figure 5:
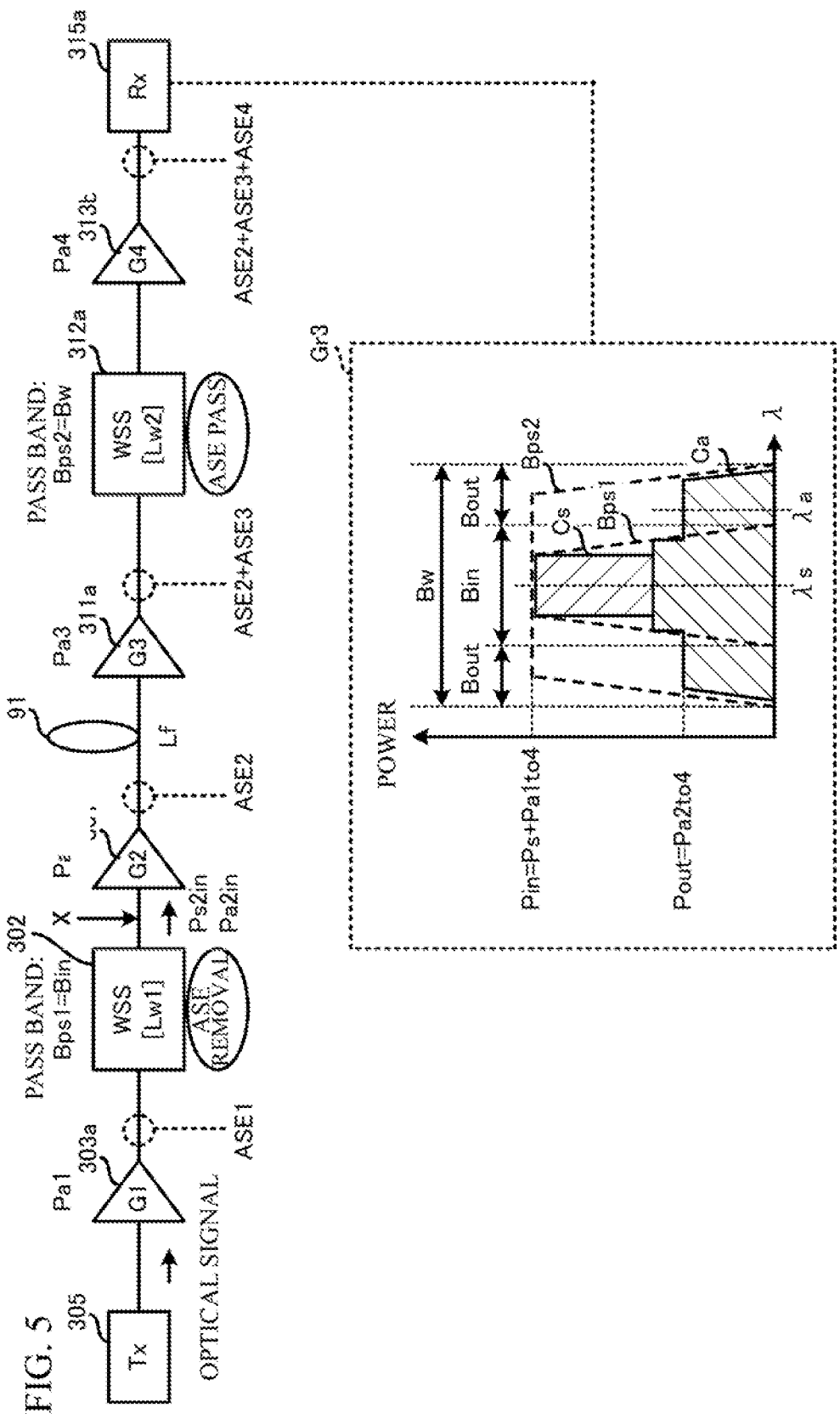
FIG. 5 is a diagram showing another example of a process of measuring the OSNR of an optical signal in the middle of a transmission path.

FIG. 5 is a diagram showing another example process of measuring the OSNR of an optical signal in the middle of the transmission path Ra. Regarding FIG. 5, the same reference signs as those used in FIG. 3 are not explained herein. In the portion indicated by reference sign Gr3, the spectrum waveform analyzed by the monitoring unit 71 or the OCM 72 of the receiver 315a is shown together with the passband Bps1 of the WSS 302 and the passband Bps2 of the WSS 312a. As indicated by reference sign X, the signal quality measurement device 1 measures the OSNR of the optical signal at the output end of the WSS 302, or the input end of the optical amplifier 301.

In this example, with respect to the corresponding channel of the optical signal, the signal quality measurement device 1 sets the passband Bps1 of the WSS 302 in the narrow band Bin, so that the ASE1 included in the sidebands Bout is removed at the WSS 302 (see "ASE removal"). Further, with respect to the corresponding channel of the signal quality measurement device 1 sets the passband Bps2 of the WSS 312a in the wide band Bw, so that the ASE2 through ASE4 included in the sidebands Bout pass through the WSS 312a (see "ASE pass"). Therefore, at the receiver 315a, only the ASE2 through ASE4 are included in the sidebands Bout. Accordingly, the side power Pout becomes equal to the combined power Pa2to4 of the ASE2 through ASE4.

$$OSNR = Ps/Pa1to4 \qquad (5)$$

$$= G2 \cdot G3 \cdot G4 \cdot Lf \cdot Lw2 \cdot Ps2in/(G2 \cdot G3 \cdot G4 \cdot Lf \cdot Lw2 \cdot Pa2in +$$
$$G3 \cdot G4 \cdot Lf \cdot Lw2 \cdot Pa2 + G4 \cdot Pa3 + Pa4)$$
$$= G2 \cdot G3 \cdot G4 \cdot Lf \cdot Lw2 \cdot Ps2in/(G2 \cdot G3 \cdot G4 \cdot Lf \cdot Lw2 \cdot Pa2in +$$
$$Pa2to4)$$

Where Ps2in represents the power of the optical signal at the input end of the optical amplifier 301, and Pa2in represents the power of the ASE at the input end of the optical amplifier 301, the OSNR of the optical signal at the receiving end is expressed by the above equation (5). Here, the power Ps of the optical signal at the receiving end has the value obtained by multiplying the power Ps2in of the optical signal at the input end of the optical amplifier 301 by the gains G2 through G4 of the optical amplifiers 301, 311a, and 313b, the loss Lw2 of the WSS 312a, and the loss Lf of the transmission path 91.

Meanwhile, the powers of the respective ASE1 through ASE4 at the receiving end have the value obtained by multiplying the powers Pa1 through Pa4 prior to the pass by the gains G2 through G4 of the optical amplifiers 301, 311a, and 313b, through which the ASE1 through ASE4 pass, the loss Lw2 of the WSS 312a, and the loss Lf of the transmission path 91. Therefore, at the receiving end, the power Pa2in of the ASE at the input end of the optical amplifier 301 turns into the value multiplied by the gains G2 through G4 of the optical amplifiers 301, 311a, and 313b, the loss Lw2 of the WSS 312a, and the loss Lf of the transmission path 91.

Further, the power Pa2 of the ASE2 has the value multiplied by the gains G3 and G4 of the optical amplifiers 311a and 313b, the loss Lw2 of the WSS 312a, and the loss Lf of the transmission path 91, and the power Pa3 of the ASE3 has the value multiplied by the gain G4 of the optical amplifier 313b. The combined power of the ASE2 to ASE4 at the receiving end is Pa2to4.

$$OSNR\_2 = Ps2in/Pa2in \qquad (6)$$
$$= (G2 \cdot G3 \cdot G4 \cdot Lf \cdot Lw2 \cdot Ps2in)/(G2 \cdot G3 \cdot G4 \cdot Lf \cdot$$
$$Lw2 \cdot Pa2in)$$
$$= Ps/(Pa1to4 - Pa2to4)$$

Accordingly, where OSNR_2 represents the OSNR of the optical signal at the input end of the optical amplifier 301, OSNR_2 is expressed by the above equation (6) based on the equation (5). In the equation (6), the power Ps of the optical signal at the receiving end and the combined power Pa1to4 of the ASE1 through ASE4 are obtained through the measurement process illustrated in FIG. 3.

$$OSNR\_2 = Ps/(Pa1to4 - Pout) \qquad (7)$$

Thus, the signal quality measurement device 1 can calculate OSNR_2 according to the above equation (7) using the side power Pout.

By setting the passband of the WSS 302 in the narrow band Bin as described above, the signal quality measurement device 1 detects, from the side power Pout, the power Pa2to4 of the ASE2 through ASE4 of the optical amplifiers 301, 311a, and 313b between the WSS 302 and the receiver 315a. At this stage, the WSS 312a exists between the WSS 302 and the receiver 315a, and therefore, the signal quality measurement device 1 sets the passband of the WSS 312a in the wide band Bw with respect to the corresponding channel of the optical signal.

As a result, the ASE2 through ASE4 of the optical amplifiers 301, 311a, and 313b in stages later than the WSS 302 pass through the WSS 312a and are input to the receiver 315a, and thus, the combined power Pa2to4 of the ASE2 through ASE4 can be detected. The signal quality measurement device 1 then calculates OSNR_2 from the detected powers Ps, Pa1to4, and Pa2to4.

Thus, the signal quality measurement device 1 can measure the OSNR (OSNR_2) of the optical signal at the input end of the optical amplifier 301 by acquiring the center power Pin and the side power Pout measured at the receiver 315a.

As described above, the signal quality measurement device 1 measures an OSNR by acquiring the center power Pin and the side power Pout measured at the receiver 315a. Thus, the signal quality measurement device 1 can measure the OSNR of an optical signal at different sites in the transmission path Ra, without any measuring instrument provided at each site.

Also, the signal quality measurement device 1 sequentially selects the WSS 302 and 312a, and sets the passband of the selected one of the WSSs 302 and 312a in the narrow band Bin, to calculate the OSNR at the output end of each of the WSSs 302 and 312a (or the input end of each of the optical amplifiers 301 and 313b). Thus, the signal quality measurement device 1 can measure the OSNR of an optical signal at different sites in the transmission path Ra simply by executing a sequence.

Further, as shown in the equations (3) and (6), the signal quality measurement device 1 subtracts the power Pa2to4 or Pa4 of the ASE of the optical amplifiers 301, 311a, and 313b between the WSS 302 or the WSS 312a and the receiver 315a, from the combined power Pa1to4 of the ASE1 through ASE4. The signal quality measurement device 1 than calculates the ratio between the value obtained through the subtraction and the power Ps of the optical signal. Thus, the OSNR of the optical signal can be calculated with high precision at different sites in the transmission path Ra.

Figure 6:
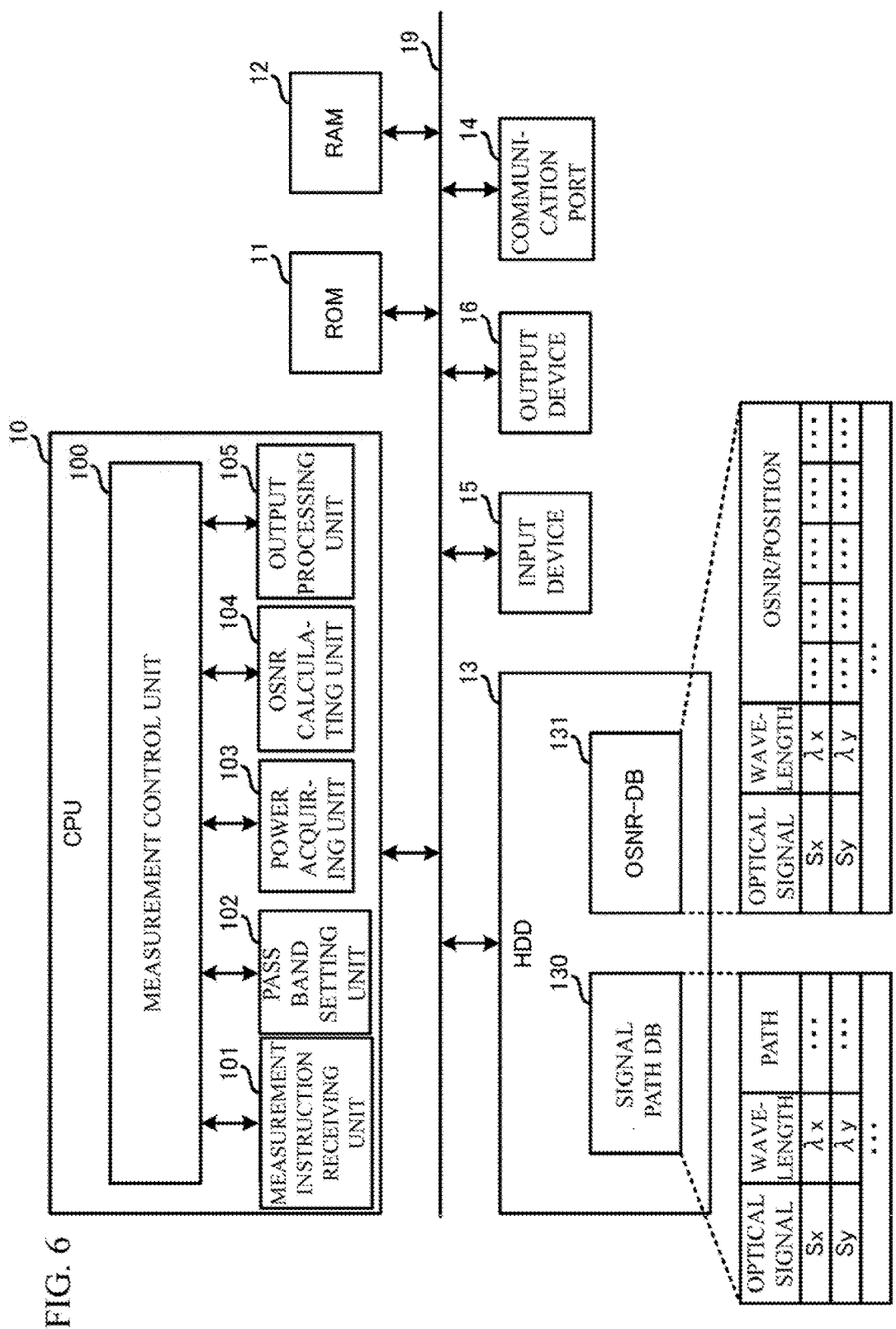
FIG. 6 is a configuration diagram showing an example of a signal quality measurement device.

FIG. 6 is a configuration diagram showing an example of the signal quality measurement device 1. The signal quality measurement device 1 includes a CPU 10, a read only memory (ROM) 11, a random access memory (RAM) 12, a hard disk drive (HDD) 13, a communication port 14, an input device 15, and an output device 16. The CPU 10 is connected to the ROM 11, the RAM 12, the HDD 13, the communication port 14, the input device 15, and the output device 16 via a bus 19, so as to input/output signals to one another.

The ROM 11 stores the program for driving the CPU 10. The RAM 12 functions as a working memory for the CPU 10. The communication port 14 is a wireless local area network (LAN) card or a network interface card (NIC), for example, and processes communications with the device control units 300, 310, and 320 of the respective ROADMs 30 through 32.

The input device 15 is a device that inputs information to the signal quality measurement device 1. The input device 15 may be a keyboard, a mouse, or a touch panel, for example. The input device 15 outputs input information to the CPU 10 via the bus 19.

The output device 16 is a device that outputs information from the signal quality measurement device 1. The output device 16 is a display, a touch panel, or a printer, for example. The output device 16 acquires information from the CPU 10 via the bus 19, and outputs the information.

The CPU 10 reads the program from the ROM 11, to form a measurement control unit 100, a measurement instruction receiving unit 101, a passband setting unit 102, a power acquiring unit 103, an OSNR calculating unit 104, and an output processing unit 105 as functions. The HDD 13 stores a signal path database (signal path DB) 130 and an OSNR database (OSNR-DB) 131.

The measurement control unit 100 controls an OSNR measurement process. In accordance with a predetermined sequence, the measurement control unit 100 issues operation instructions to the measurement instruction receiving unit 101, the passband setting unit 102, the power acquiring unit 103, the OSNR calculating unit 104, and the output processing unit 105.

The measurement instruction receiving unit 101 receives an OSNR measurement instruction from the input device 15, for example. The measurement instruction contains designation of a starting node and an ending node of the nodes #1 to #n of the transmission section for the optical signal to be measured, for example. The measurement instruction receiving unit 101 outputs the information designated by the measurement instruction to the measurement control unit 100.

In accordance with the information from the measurement instruction receiving unit 101, the measurement control unit 100 searches the signal path DB 130 for the optical signal to be measured. For example, the identifiers (Sx, Sy, . . . ) of optical signals, the center wavelengths (wavelengths λx, λy, . . . ) of the optical signals, and the transmission paths (paths) of the optical signals are registered in the signal path DB 130. The measurement control unit 100 compares the information designating the starting node and the ending node of the nodes #1 to #n with the path information stored in the signal path DB 130, to search for the optical signal to be measured. In the path information, the respective identifiers of the transmitters 305 and 315b, the WSSs 302, 312a, and 312b, the optical amplifiers 303a, 301, 311a, 311b, 321, and 323a, and the receivers 315a and 325 of the nodes #1 through #n in the transmission paths Ra and Rb are registered in the order in which an optical signal passes through these components.

The measurement control unit 100 acquires the wavelength information and the path information about the optical signal to be measured from the signal path DB 130, and notifies the passband setting unit 102, the power acquiring unit 103, the OSNR calculating unit 104, and the output processing unit 105 of the wavelength information and the path information. The measurement control unit 100 issues operation instructions to the passband setting unit 102, the power acquiring unit 103, and the OSNR calculating unit 104, to carry out a measurement process as described above with reference to FIG. 3, 4, or 5, for example.

The passband setting unit 102 is an example of the setting processing unit, and sets the respective passbands of the WSSs 302, 312a, and 312b. More specifically, the passband setting unit 102 communicates with the network supervisory control device 2 via the communication port 14, to search for the channel assigned to the wavelength of the optical signal to be measured, and sets the passband of the channel.

The power acquiring unit 103 acquires the center power Pin and the side power Pout from the receiver 315a or 325 in the transmission path Ra or Rb via the communication port 14. The measurement control unit 100 notifies the OSNR calculating unit 104 of the center power Pin and the side power Pout. As a result, the OSNR calculating unit 104 obtains the center power Pin and the side power Pout.

The OSNR calculating unit 104 is an example of the calculating unit, and calculates the OSNR of the optical signal by obtaining the center power Pin and the side power Pout. The OSNR calculating unit 104 detects the power of the optical signal and the powers of the ASE1 through ASE4, in accordance with the setting of the passbands by the passband setting unit 102.

In the measurement process illustrated in FIG. 3, as the passband setting unit 102 sets the respective passbands of the WSSs 302 and 312a in the wide band Bw including the narrow band Bin and the sidebands Bout, the OSNR calculating unit 104 detects the combined power Pa1to4 of the ASE1 through ASE4 from the side power Pout, and detects the power Ps of the optical signal from the center power Pin and the side power Pout. By doing so, the OSNR calculating unit 104 calculates the OSNR of the optical signal to be input to the receiver 315a (or the optical signal at the receiving end).

In the measurement process illustrated in FIG. 4, as the passband setting unit 102 sets the passband of the WSS 312a in the narrow band Bin, the OSNR calculating unit 104 detects the power Pa4 of the ASE4 of the optical amplifier 313b between the WSS 312a and the receiver 315a from the side power Pout. The OSNR calculating unit 104 then calculates OSNR_4 from the detected powers Ps, Pa1to4, and Pa4.

Thus, the OSNR calculating unit 104 can calculate the OSNR (OSNR_4) of the optical signal at the input end of the optical amplifier 313b by obtaining the center power Pin and the side power Pout measured at the receiver 315a.

In the measurement process illustrated in FIG. 5, as the passband setting unit 102 sets the passband of the WSS 302 in the narrow band Bin, the OSNR calculating unit 104 detects, from the side power Pout, the power Pa2to4 of the ASE2 through ASE4 of the optical amplifiers 301, 311a, and 313b between the WSS 302 and the receiver 315a. Since the WSS 312a exists between the WSS 302 and the receiver 315a, the passband setting unit 102 sets the passband of the WSS 312a in the wide band Bw in this case, with respect to the corresponding channel of the optical signal.

That is, in a case where the passband of one of the WSSs 302, 312a, 312b, and 322 is set in the narrow band Bin, and another WSS exists between the one WSS and the receiver 315a or 325, the passband setting unit 102 sets the passband of the other WSS in the wide band Bw. As a result, the ASE2 through ASE4 of the optical amplifiers 301, 311a, and 313b in stages later than the WSS 302 pass through the WSS 312a, and are input to the receiver 315a. Thus, it becomes possible to detect the combined power Pa2to4 of the ASE2 through ASE4. The OSNR calculating unit 104 then calculates OSNR_2 from the detected powers Ps, Pa1to4, and Pa2to4.

Thus, the OSNR calculating unit 104 can calculate the OSNR (OSNR_2) of the optical signal at the input end of the optical amplifier 301 by obtaining the center power Pin and the side power Pout measured at the receiver 315a.

Also, as the passband setting unit 102 sequentially selects the WSS 302 and 312a, and sets the passband of the selected one of the WSSs 302 and 312a in the narrow band Bin, the OSNR calculating unit 104 calculates the OSNR at the output end of each of the WSSs 302 and 312a (or the input end of each of the optical amplifiers 301 and 313b). Thus, the signal quality measurement device 1 can measure the OSNR of an optical signal at different sites in the transmission path Ra simply by executing a sequence.

Further, as shown in the equations (3) and (6), the OSNR calculating unit 104 subtracts the power Pa2to4 or Pa4 of the ASE of the optical amplifiers 301, 311a, and 313b between the WSS 302 or the WSS 312a and the receiver 315a, from the combined power Pa1to4 of the ASE1 through ASE4. The OSNR calculating unit 104 than calculates the ratio between the value obtained through the subtraction and the power Ps of the optical signal. Thus, the OSNR of the optical signal can be calculated with high precision at different sites in the transmission path Ra.

The OSNR calculating unit 104 also calculates the OSNR of the optical signal in each of sections divided by the transmitters 305 and 315b, the WSSs 302, 312a, 312b, and 322, and the receivers 315a and 325, and calculates a noise figure NF from the OSNR of the optical signal in each of the sections.

$$\text{OSNR\_}A = \text{OSNR\_}2 \tag{8}$$

$$\text{OSNR\_}B = (\text{OSNR\_}4^{-1} - \text{OSNR\_}2^{-1})^{-1} \tag{9}$$

$$\text{OSNR\_}C = (\text{OSNR}^{-1} - \text{OSNR\_}4^{-1})^{-1} \tag{10}$$

In the case of the transmission path Ra, where OSNR_A represents the OSNR in the section from the transmitter 305 to the input end of the optical amplifier 301, OSNR_A is calculated according to the above equation (8). Where OSNR_B represents the OSNR in the section from the input end of the optical amplifier 301 to the input end of the optical amplifier 313b, OSNR_B is calculated according to the above equation (9). Where OSNR_C represents the OSNR in the section from the input end of the optical amplifier 313b to the receiver 315a, OSNR_C is calculated according to the above equation (10). It should be noted that the OSNR in the equation (10) is the OSNR of the optical signal at the receiving end of the transmission path Ra.

$$\begin{aligned} \text{OSNR} &= (G \cdot Px)/(G/NF \cdot hv\Delta f) \\ &= Px/NF \cdot hv\Delta f \end{aligned} \tag{11}$$

Also, an OSNR is normally expressed by the above equation (11). In the equation (11), G represents the gain of the section, Px represents the input power of the optical signal in the section, h represents the Planck constant, υ represents the frequency of the optical signal, and Δf represents the sideband Bout.

Thus, the signal quality measurement device 1 can calculate the noise figure NF of each section according to the equation (11) by calculating the OSNR in each section according to the equations (8) through (10) after measuring the input power Px. The signal quality measurement device 1 can further increase the accuracy of the network design by calculating the noise figures NF.

Every time the OSNR calculating unit 104 measures an OSNR, the OSNR calculating unit 104 records the OSNR into the OSNR-DB 131. In the OSNR-DB 131, the identifiers of optical signals, the center wavelengths (wavelengths) of the optical signals, and the OSNRs in the respective positions in the transmission path Ra are registered, for example. When the OSNR measurement at all the sites in the transmission path Ra is completed, the measurement control unit 100 causes the output processing unit 105 to output the contents of the OSNR-DB 131 to the output device 16.

Figure 7:
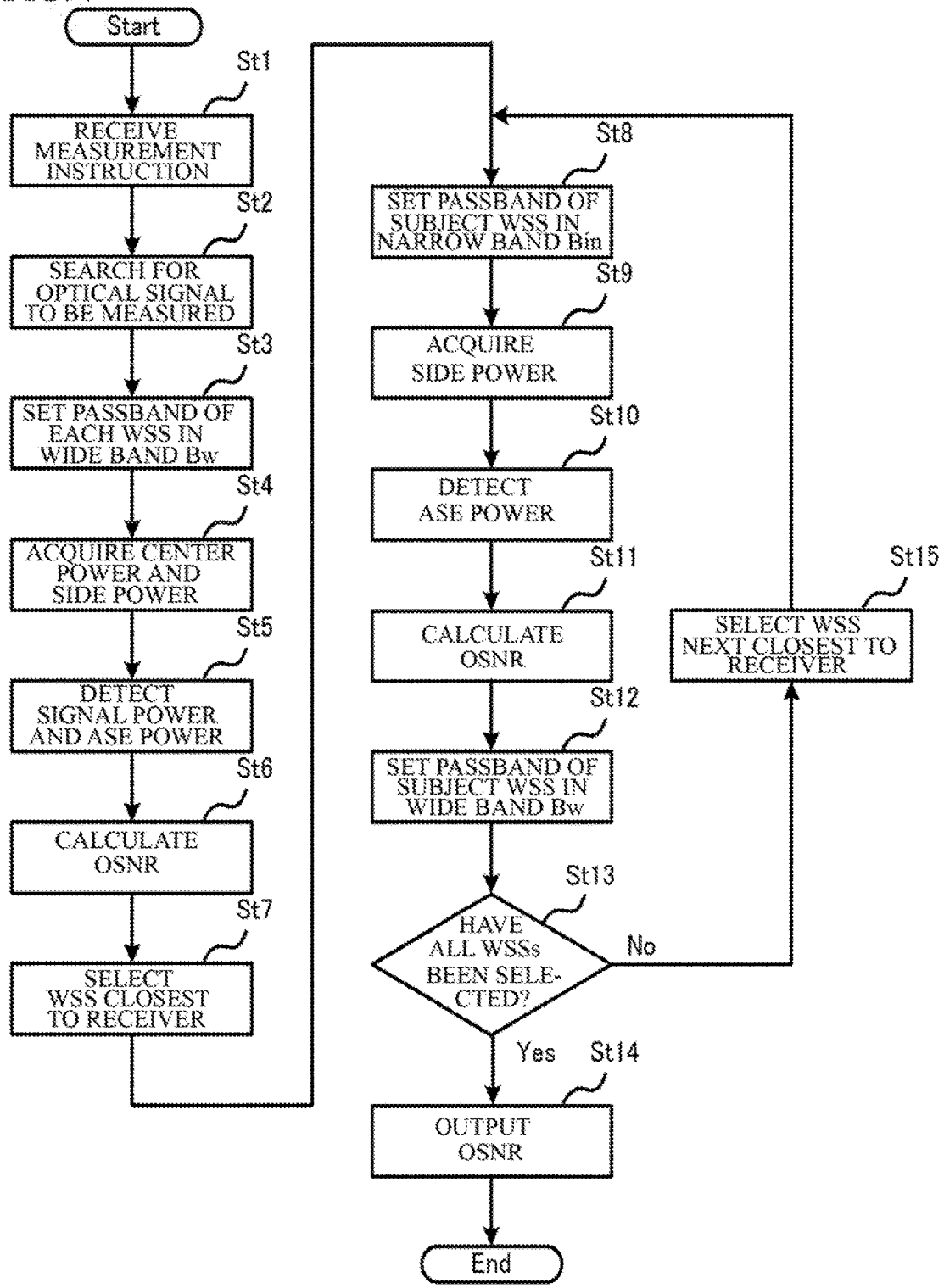
FIG. 7 is a flowchart showing an example of a signal quality measurement method.

FIG. 7 is a flowchart showing an example of a signal quality measurement method. The signal quality measurement method is implemented by the signal quality measurement device 1.

The measurement instruction receiving unit 101 receives a measurement instruction from the input device 15 (step St1). The measurement control unit 100 then searches the signal path DB 130 for the optical signal to be measured (step St2). Steps ST3 through St6 that follow are equivalent to the measurement process illustrated in FIG. 3.

The passband setting unit 102 sets the passbands of the respective WSSs 302 and 312a in the wide band Bw (step St3). The power acquiring unit 103 then acquires the center power Pin and the side power Pout from the receiver 315a (step St4). The OSNR calculating unit 104 detects the power Ps of the optical signal and the power Pa1to4 of the ASEs from the center power Pin and the side power Pout (step St5). The OSNR calculating unit 104 then calculates the OSNR of the optical signal at the receiving end of the transmission path Ra (step St6).

The measurement control unit 100 then selects the WSS 312a, which is the closest to the receiver 315a in the transmission path Ra (step St7). Steps St8 through St12 that follow are equivalent to the measurement processes illustrated in FIGS. 4 and 5. In the case of the transmission path Ra, the respective procedures in steps St8 through St12 are carried out twice. The first time is equivalent to the measurement process illustrated in FIG. 4, and the second time is equivalent to the process illustrated in FIG. 5. However, the measurement process illustrated in FIG. 5 may be carried out before the measurement process illustrated in FIG. 4.

The passband setting unit 102 sets the passband of the selected WSS 312a in the narrow band Bin (step St8). The power acquiring unit 103 then acquires the side power Pout from the receiver 315a (step St9). The OSNR calculating unit 104 detects the power Pa4 of the ASE from the side power Pout (step St10). The OSNR calculating unit 104 then calculates OSNR_2 of the optical signal at the input end of the optical amplifier 313b in the transmission path Ra (step St11).

The passband setting unit 102 then sets the passband of the selected WSS 312a in the wide band Bw (step St12). The measurement control unit 100 then determines whether all the WSSs 302 and 312a in the transmission path Ra have been selected (step St13).

If there is an unselected WSS 302 (No in step St13), the measurement control unit 100 selects the WSS 302 that is the next closest to the receiver 315a after the selected WSS 312a (step St15).

The passband setting unit 102 sets the passband of the selected WSS 302 in the narrow band Bin (step St8). The power acquiring unit 103 then acquires the side power Pout from the receiver 315a (step St9). The OSNR calculating unit 104 detects the power Pa2to4 of the ASEs from the side power Pout (step St10). The OSNR calculating unit 104 then calculates OSNR_4 of the optical signal at the input end of the optical amplifier 301 in the transmission path Ra (step St11). Every time the OSNR calculating unit 104 calculates an OSNR, the OSNR calculating unit 104 registers the OSNR, together with the positional information indicating the corresponding site in the transmission path Ra, into the OSNR-DB 131.

If all the WSSs 302 and 312a in the transmission path Ra have been selected (Yes in step St13), the measurement control unit 100 causes the output processing unit 105 to output the information in the OSNR-DB 131 to the output device 16 (step St14). The output OSNR information is used in designing a network, for example. In this manner, the signal quality measurement method is implemented.

Next, the passband setting by the passband setting unit 102 is described.

Figure 8:
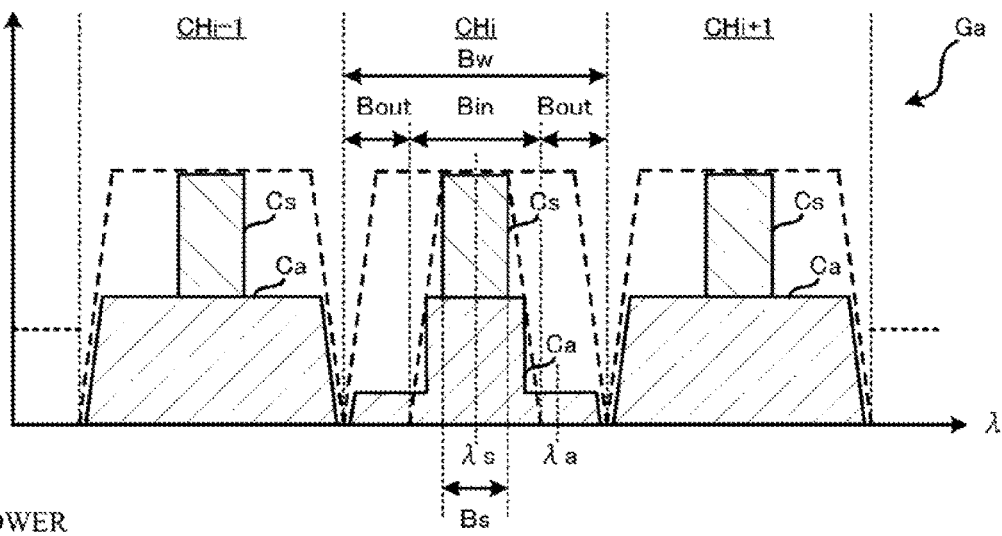
FIG. 8 shows spectrum waveform charts illustrating examples of setting of passbands of wavelength selective switches.
Figure 8:
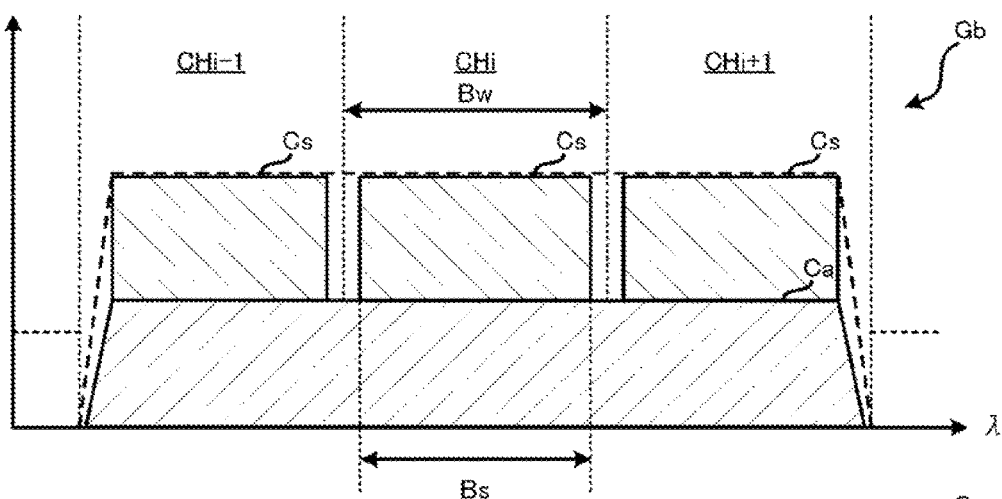
Figure 8:
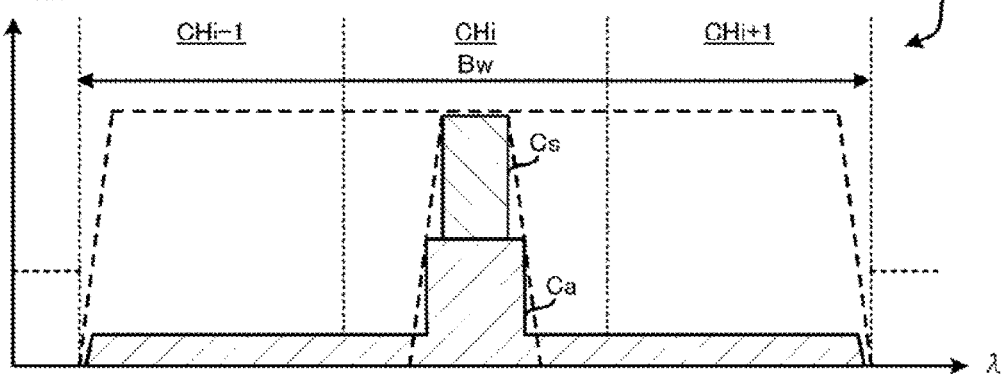

FIG. 8 shows spectrum waveform charts illustrating examples of the setting of the passbands of the WSSs 302, 312a, 312b, and 322. In FIG. 8, the same parameters as those shown in FIGS. 3 and 4 are denoted by the same reference signs as those used in FIGS. 3 and 4, and explanation thereof is not made herein. FIG. 8 shows spectrum waveforms of the channel CHi (i being a positive integer) of the optical signal to be measured, and spectrum waveforms of the adjacent channels CHi−1 and CHi+1 on the long-wavelength side and the short-wavelength side of the channel CHi.

Reference sign Ga indicates a spectrum waveform chart in a case where other optical signals are held in the adjacent channels CHi−1 and CHi+1. The passband setting unit 102 preferably makes the narrow band Bin sufficiently large relative to the bandwidth Bs of the optical signal, so as to prevent deterioration of the optical signal to be measured in the channel CHi. That is, the relationship, Bin»Bs, is established between the narrow band Bin and the bandwidth Bs of the optical signal.

Reference sign Gb indicates a spectrum waveform chart in a case where the bandwidth Bs of the optical signal in the channel CHi is great, and the difference between the bandwidth Bs and the wide band Bw assigned to the channel CHi is small. In this case, the passband setting unit 102 cannot keep the sidebands Bout sufficiently large for removing an ASE. Therefore, the measurement control unit 100 may issue an instruction to measure the OSNR of another optical signal having the same starting node and the ending node of the nodes #1 to #n as the optical signal to be measured.

Reference sign Gc indicates a spectrum waveform chart in a case where any other optical signal is not held in the adjacent channels CHi−1 and CHi+1 of the channel CHi of the optical signal to be measured. In this case, the passband setting unit 102 may expand the wide band Bw not only in the band assigned to the channel CHi but also into the bands assigned to the adjacent channels CHi−1 and CHi+1. As long as ASE powers can be properly detected, the wide band Bw is not particularly limited.

Alternatively, the signal quality measurement device 1 may use CW light as the optical signal to be measured.

Figure 9:
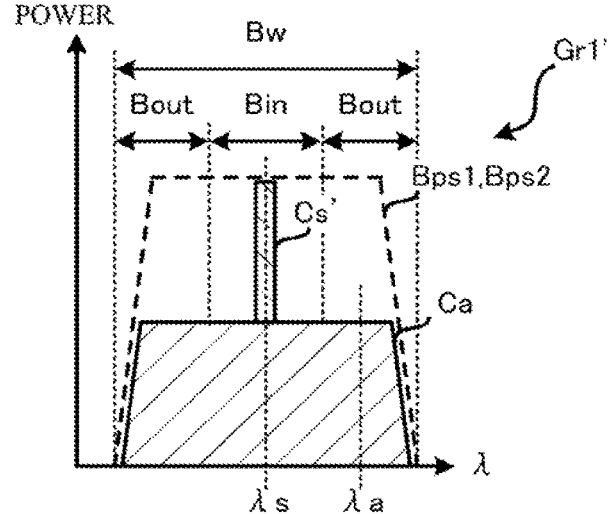
FIG. 9 shows spectrum waveform charts illustrating cases where continuous wave (CW) light is used.
Figure 9:
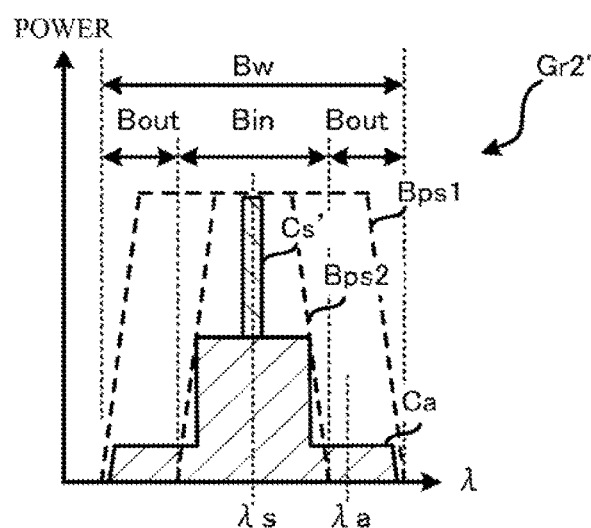
Figure 9:
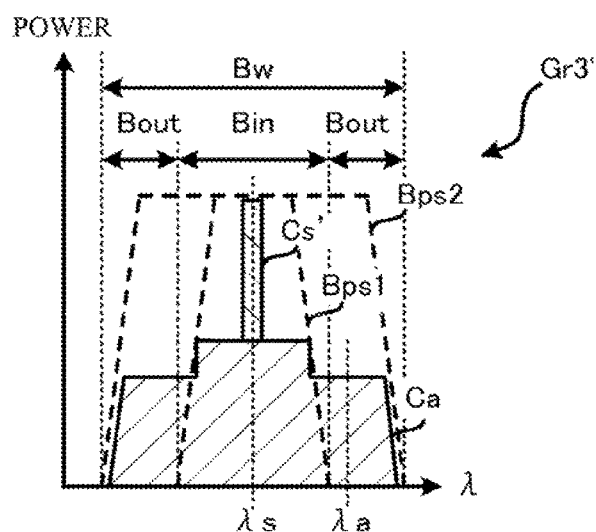

FIG. 9 shows spectrum waveform charts in cases where CW light is used. Reference sign Gr1' corresponds to the spectrum waveform chart indicated by reference sign Gr1 in FIG. 3, reference sign Gr2' corresponds to the spectrum waveform chart indicated by reference sign Gr2 in FIG. 4, and reference sign Gr3' corresponds to the spectrum waveform chart indicated by reference sign Gr3 in FIG. 5.

The transmitters 305 and 315b may have operation modes including a test mode for measuring an OSNR, and an active mode for performing a regular operation. The transmitters 305 and 315b transmit CW light in the test mode, and transmit normal optical signals in the active mode. The measurement control unit 100 of the signal quality measurement device 1 switches the operation mode of the transmitter 305 or 315b to the test mode when an OSNR is measured.

As indicated by reference signs Gr1' through Gr3', the bandwidth of the optical component Cs' of CW light is narrower than that of a normal optical signal, and accordingly, it becomes easier to detect ASE powers in the sidebands Bout.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A signal quality measurement device that measures quality of an optical signal that is transmitted from a transmitter, passes through wavelength selective switches and optical amplifiers, and is received by a receiver, the signal quality measurement device comprising:
a memory, and
a processor coupled to the memory, the processor being coupled to:
set respective passbands of the wavelength selective switches; and
calculate the quality of the optical signal by acquiring a first power of an optical component in a first wavelength band including a center wavelength of the optical signal received by the receiver, and a second power of an optical component in a second wavelength band adjacent to the first wavelength band,
wherein the processor
detects a combined power of various amplified spontaneous emissions of the optical amplifiers from the second power, and detects a power of the optical signal from the first power and the second power, when the processor sets each of the passbands of the wavelength selective switches as a wavelength band including the first wavelength band and the second wavelength band,
detects, from the second power, the amplified spontaneous emission of at least one optical amplifier existing between one of the wavelength selective switches and the receiver among the optical amplifiers, when the processor sets the passband of one of the wavelength selective switches as the first wavelength band, and
calculates the quality of the optical signal from each of the detected powers.

2. The signal quality measurement device of claim 1, wherein, when the passband of one of the wavelength selective switches is set as the first wavelength band, and another wavelength selective switch exists between the one of the wavelength selective switches and the receiver, the processor sets the passband of the another wavelength selective switch as a wavelength band including the first wavelength band and the second wavelength band.

3. The signal quality measurement device of claim 1, wherein, when the processor sequentially selects one of the wavelength selective switches, and sets the passband of the selected one of the wavelength switches as the first wavelength band, the processor calculates the quality of the optical signal at the output end of each of the wavelength selective switches.

4. The signal quality measurement device of claim 1, wherein the processor subtracts the power of the amplified spontaneous emission of the at least one optical amplifier existing between one of the wavelength selective switches and the receiver from the combined power of the various amplified spontaneous emissions of the optical amplifiers, and calculates a ratio between the value obtained through the subtraction and the power of the optical signal.

5. The signal quality measurement device of claim 1, wherein the processor calculates the quality of the optical signal in each of sections divided by the transmitter, the wavelength selective switches, and the receiver, and calculates a noise figure from the quality of the optical signal in each section.

6. The signal quality measurement device of claim 1, wherein the optical signal is CW light.

7. A signal quality measurement method of measuring quality of an optical signal that is transmitted from a transmitter, passes through wavelength selective switches and optical amplifiers, and is received by a receiver,
the signal quality measurement method comprising:
acquiring a first power of an optical component in a first wavelength band including a center wavelength of the optical signal received by the receiver, and a second power of an optical component in a second wavelength band adjacent to the first wavelength band;
detecting a combined power of various amplified spontaneous emissions of the optical amplifiers from the second power, and detecting a power of the optical signal from the first power and the second power, by setting each of the passbands of the wavelength selective switches as a wavelength band including the first wavelength band and the second wavelength band;
detecting, from the second power, amplified spontaneous emission of at least one optical amplifier existing between one of the wavelength selective switches and the receiver among the optical amplifiers, by setting the passband of one of the wavelength selective switches as the first wavelength band; and
calculating the quality of the optical signal from each of the detected powers.

8. The signal quality measurement method of claim 7, wherein, when the passband of one of the wavelength selective switches is set as the first wavelength band, and another wavelength selective switch exists between the one of the wavelength selective switches and the receiver, the passband of the another wavelength selective switch is set as a wavelength band including the first wavelength band and the second wavelength band.

9. The signal quality measurement method of claim 7, wherein, when one of the wavelength selective switches is sequentially selected, and the passband of the selected one of the wavelength switches is set as the first wavelength band, the quality of the optical signal at the output end of each of the wavelength selective switches is calculated.

10. The signal quality measurement method of claim 7, wherein the power of the amplified spontaneous emission of the at least one optical amplifier existing between one of the wavelength selective switches and the receiver is subtracted from the combined power of the various amplified spontaneous emissions of the optical amplifiers, and a ratio between the value obtained through the subtraction and the power of the optical signal is calculated.

11. The signal quality measurement method of claim 7, wherein the quality of the optical signal in each of sections divided by the transmitter, the wavelength selective switches, and the receiver is calculated, and a noise figure is calculated from the quality of the optical signal in each section.

12. The signal quality measurement method of claim 7, wherein the optical signal is CW light.

* * * * *